United States Patent
Katoh et al.

(10) Patent No.: US 7,263,625 B2
(45) Date of Patent: Aug. 28, 2007

(54) POWER SUPPLY CONTROLLER FOR CHANGING IN A PREDETERMINED TEMPORAL ORDER A COMBINATION OF VOLTAGES SUPPLIED TO AN INFORMATION PROCESSOR

(75) Inventors: Takayuki Katoh, Yokohama (JP); Hideshi Tsukamoto, Tokyo (JP)

(73) Assignee: Lenovo (Singapore0 Pte. Ltd., Singapore (SG)

( * ) Notice: Subject to any disclaimer, the term of this patent is extended or adjusted under 35 U.S.C. 154(b) by 413 days.

(21) Appl. No.: 10/707,389

(22) Filed: Dec. 10, 2003

(65) Prior Publication Data

US 2004/0181699 A1    Sep. 16, 2004

(30) Foreign Application Priority Data

Feb. 5, 2003    (JP) .............................. 2003-028377

(51) Int. Cl.
*G06F 1/26* (2006.01)
(52) U.S. Cl. ...................... 713/330; 713/300; 713/310
(58) Field of Classification Search ......... 713/300–340
See application file for complete search history.

(56) References Cited

U.S. PATENT DOCUMENTS

| | | | | |
|---|---|---|---|---|
| 5,860,125 A | * | 1/1999 | Reents ....................... | 713/320 |
| 6,333,650 B1 | * | 12/2001 | Amin et al. ................. | 327/143 |
| 6,651,178 B1 | * | 11/2003 | Voegeli et al. .............. | 713/300 |
| 6,710,621 B2 | * | 3/2004 | Devlin et al. ................ | 326/38 |
| 6,738,915 B1 | * | 5/2004 | Mott et al. .................. | 713/330 |
| 6,771,052 B2 | * | 8/2004 | Ostojic ....................... | 323/266 |
| 6,850,048 B2 | * | 2/2005 | Orr et al. .................... | 323/299 |
| 6,917,123 B2 | * | 7/2005 | Rowe .......................... | 307/43 |
| 7,013,402 B2 | * | 3/2006 | Woo ........................... | 713/330 |

FOREIGN PATENT DOCUMENTS

JP        2002-251230        9/2002

* cited by examiner

*Primary Examiner*—Rehana Perveen
*Assistant Examiner*—Paul Yanchus, III
(74) *Attorney, Agent, or Firm*—John L. Rogitz

(57) ABSTRACT

A power supply controller which controls a power supply unit for supplying a plurality of different voltages has a state register section which stores state values corresponding to a combination of voltages supplied by the power supply unit in the plurality of voltages, a reference clock oscillator section which oscillates a reference clock, a state value changing combination circuit which changes the state values one by one in a predetermined order to state values corresponding to a target combination of voltages when a change instruction to change the combination of voltages supplied by the power supply unit is received, and an output section which transmits the power supply unit provide the combination of voltages corresponding to the state values successively changed by the state value changing combination circuit.

17 Claims, 7 Drawing Sheets

| OPERATING MODE | POWER SUPPLY M | POWER SUPPLY A | POWER SUPPLY B |
|---|---|---|---|
| ALL-POWER-SUPPLY OFF | OFF | OFF | OFF |
| POWER SUPPLY OFF | ON | OFF | OFF |
| SUSPEND | ON | ON | OFF |
| POWER SUPPLY ON | ON | ON | ON |

FIGURE 4

POWER SUPPLY CONTROLLER FOR CHANGING IN A PREDETERMINED TEMPORAL ORDER A COMBINATION OF VOLTAGES SUPPLIED TO AN INFORMATION PROCESSOR

BACKGROUND OF INVENTION

1. Field of the Invention

The present invention relates to a power supply controller and an information processor. More particularly, the present invention relates to a power supply controller that directs a plurality of different voltages output from a power supply for use in different integrated circuits and to an information processor powered by the plurality of voltages.

2. Background of the Invention

A conventional information processor used in a personal computer requires a number of different voltages for normal operation. For example, an integrated circuit used in an information processor operates with a voltage according to the width of a signal line in the integrated circuit. In some cases, a single integrated circuit operates with a plurality of different voltages.

For every integrated circuit, a standard is provided which specifies the sequence for successively turning on multiple power supplies to safely distribute power to discrete circuits within an integrated circuit that operate on different voltages. For example, it is usually necessary to begin supplying a plurality of voltages sequentially, starting with a lower voltage. To turn off the supply of power the process is reversed, turning off the supply starting with a higher voltage, in order to prevent destruction or a malfunction of the integrated circuit.

The prior art includes a method of providing differential delay for a plurality of control signals used in power supply management. However, this method suffers from increased cost due to the need for additional delay circuits and increased circuit area dedicated to the power supply control function. Another prior art solution utilizes a microprocessor to control the timing of turn-on of each of a plurality of voltages. However, this method requires increased power consumption since even when no voltage is supplied to the information processor, the control microprocessor is driven in preparation for supplying a new voltage.

SUMMARY OF INVENTION

The present invention is directed towards a power supply controller and an information processor capable of solving the above described problems.

According to a first embodiment of the present invention, an information processor is provided that includes a power supply controller to direct the output of a plurality of voltages from a power supply unit. The power supply controller includes a state register which stores state values corresponding to a combination of voltages supplied by the power supply unit, a reference clock oscillator to synchronize state transitions, a finite state machine which changes the state values one by one in a predetermined order to values corresponding to a target combination of voltages when a change instruction to change the combination of voltages supplied by the power supply unit is received, and an output section which communicates the combination of voltages corresponding to the state values assigned by the finite state machine (identified as state value changing combination circuit).

BRIEF DESCRIPTION OF DRAWINGS

FIG. 4 is a diagram showing details of a plurality of operating modes discriminated in power consumption;

DETAILED DESCRIPTION

Figure 1:
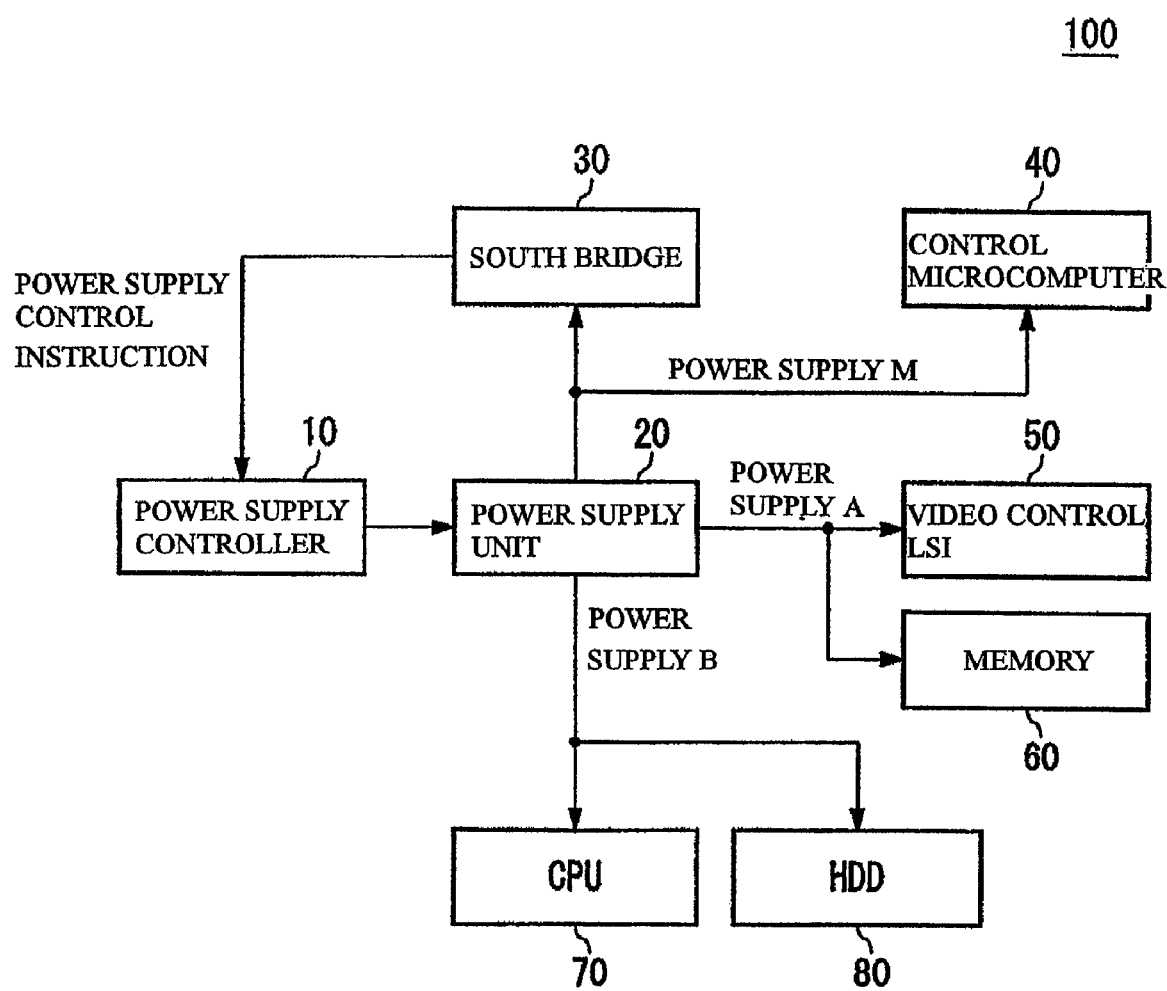
FIG. 1 is a block diagram of an information processor 100.

FIG. 1 shows a block diagram of an information processor 100. The information processor 100 has a power supply controller 10 coupled to a power supply unit 20 which converts a voltage supplied from a battery or an AC adapter into a plurality of voltages suitable for powering the various functional blocks of the information processor 100. The power supply unit 20 distributes the converted voltages to different sections of the information processor 100 according to instructions from the power supply controller 10. The other functional elements of the information processor 100 include a south bridge 30; a control microcomputer 40; a video control circuit 50 and a memory 60; a CPU 70; and a hard disk drive (HDD) 80, all powered by a variety of voltages.

The information processor 100 has a number of predetermined power consumption modes that assign different voltages to each functional block. These include the following: a suspend mode in which the power supplied to the CPU is stopped while the contents of the memory are held, and a power-supply-on mode in which power is supplied to the CPU and other sections, such as the memory used when the CPU is operating to enable information processing. When the power supply controller 10 receives a power supply control instruction from the south bridge 30 to change the operating mode, it selects a particular combination of supply voltages to suit the operating requirements of the information processor 100. The combination of supply voltages is determined according to the power supply control instruction. Each voltage can be independently set in the on/off state. The power supply controller 10 notifies the power supply unit 20 of the selected combination of power supplies and voltages. The power supply unit 20 provides the combinations of power supply voltages according to the message from the power supply controller 10.

For example, the power supply controller 10 interfaces with the power supply unit 20 to direct the distribution of multiple voltage power supplies to the desired functional unit of the information processor 100. As shown in FIG. 1, the preferred embodiment includes multiple voltage power supplies M, A and B, each of which can be independently set in the on/off state. In addition, the supply voltages can be independently routed from the power supply unit 20 to the south bridge 30 and the control microcomputer 40, the video control circuit 50 and memory 60, as well as the CPU 70 and the hard disk drive 80. The power supply controller 10 sets each of the power supplies M, A, and B in the on/off state according to a power control instruction. The power supply controller 10 may further direct an auxiliary power supply (Vaux) for a LAN device. In the embodiment shown in FIG.

1, the plurality of power supply voltages are formed, for example, by branching and scaling one power supply from the single power supply unit 20 by FET switches.

Alternatively, the plurality of power supply voltages may be generated by several power supply units operating independently. The power supply controller 10 may receive a power control instruction from the south bridge 30 even when the power supply M is disabled. That is, part of the south bridge 30 is driven by another power supply even when the power supply M is turned off. In addition, power supply controller 10 may receive a power supply control instruction from a different logical circuit when power supply M is turned off.

Figure 2:
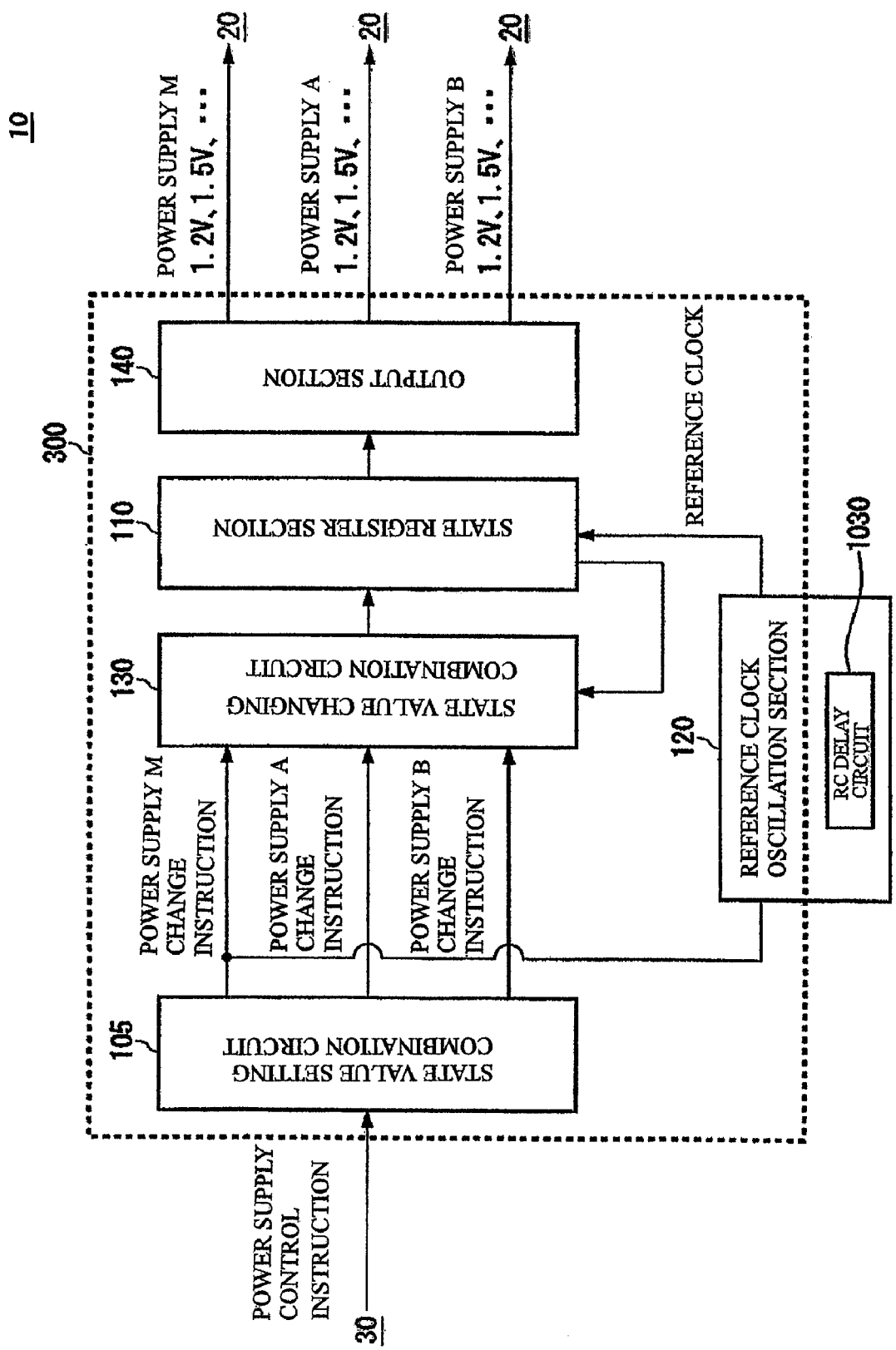
FIG. 2 is a block diagram of a power supply controller 10.

FIG. 2 illustrates a block diagram of the power supply controller 10, which directs the supply of different voltages from the power supply unit 20 to the functional units of the information processor 100. The power supply controller 10 receives a power supply control instruction from the south bridge 30. The power supply controller 10 then effects a transition of combinations of power supplies and voltages provided for the internal sections of the information processor 100 to other combinations of power supplies and voltages designated by the power supply control instruction. During this transition, in the state of provision of power supplies and voltages, the power supply controller 10 starts or stops providing the plurality of power supplies in a predetermined order.

The power supply controller 10 includes a power supply control circuit 300 and an RC delay circuit 1030. The reference clock 120 of the power supply control circuit 300 oscillates in accordance with the configuration of the RC delay circuit 1030 specified by a power supply control instruction from the south bridge 30. The reference clock triggers the state transition of the power supply control circuit 300. The power supply control circuit 300 includes a state value setting combination circuit 105, a state register section 110, the portion of a reference clock generation section 120 excluding the RC delay circuit 1030, a state value changing combination circuit 130, and an output section 140. The state value setting combination circuit 105 generates a change instruction to change the combination of voltages supplied to the information processor 100 according to the power supply control instruction received from the south bridge 30. The change instruction is then transmitted to the state value changing combination circuit 130.

For example, the state value setting combination circuit 105 sends a power supply M change instruction to the state value changing combination circuit 130 to begin supplying a plurality of voltages to the south bridge 30 and the control microcomputer 40 via power supply M. When the reference clock oscillation section 120 receives a change instruction indicating that a voltage will be supplied to one of the plurality of sections from the state value setting combination circuit 105, it transmits the reference clock at a frequency corresponding to the amount of delay of the RC delay circuit 1030, and supplies the reference clock to the state register section 110. Because this embodiment is designed so that the power supply M is turned on when a voltage is supplied to any one of the plurality of sections, the reference clock oscillation section 120 outputs the reference clock when the power supply M change instruction to turn on the predetermined power supply M is received.

The state value changing combination circuit 130 receives a change instruction from the state value setting combination circuit 105 to change the combination of power supplies provided by the power supply unit 20 for the information processor 100. In this event, the state value changing combination circuit 130 changes state values stored in the state register section 110 in the predetermined order to values corresponding to a combination of power supplies with which the current combination of power supplies is to be replaced. More specifically, when the state value changing combination circuit 130 receives a change instruction, it stores, an initial value, in the state register section 110 in accordance with the change instruction. The state value changing combination circuit 130 selects a next state value according to the present state value stored in the state register section 110, and sets the selected state value in the state register section 110. The state value changing combination circuit 130 updates this setting operation in accordance with the reference clock.

The state register section 110 stores state values related to combinations of voltages supplied to the plurality of functional sections of the information processor 100 by the power supply unit 20. That is, the state register section 110 stores state values related to combinations of power supplies provided for the information processor 100 in the plurality of power supplies and also to combinations of voltages supplied to the circuits to which the power supplies are routed. Each time the state register section 110 receives a reference clock pulse from the reference clock oscillation section 120, it updates the present state value to a next value set from the state value changing combination circuit 130. That is, the state register section 110, and the state value changing combination circuit 130 constitute a state machine which effects state transitions in synchronization with the reference clock.

The output section 140 receives the state values changed one by one by the state value changing combination circuit 130 and notifies the power supply unit 20 of a power supply instruction designating the combination of power supplies and the combination of voltages corresponding to the state values. The output section 140 thereby directs the power supply unit 20 to supply the combinations of power supplies and voltages corresponding to the state values to the sections of the information processor 100. For example, the output section 140 notifies the power supply unit 20 of a power supply instruction to supply a plurality of voltages different from each other, e.g., 1.2 V and 1.5 V, from the power supply unit 20 to the sinks connected to power supply M.

The power supply controller 10 notifies the power supply unit 20 of a power supply instruction in a predetermined order to start supplying power from each power supply, thereby preventing a malfunction or destruction of the information processor 100. In addition, the power supply controller 10 starts supplying a plurality of voltages sequentially by notifying the power supply unit 20 of instructions in a predetermined order. The sequence of power distribution is performed according to the specifications of the integrated circuits to which the voltages are routed, which reduces the risk of damage to the integrated circuits.

Figure 3:
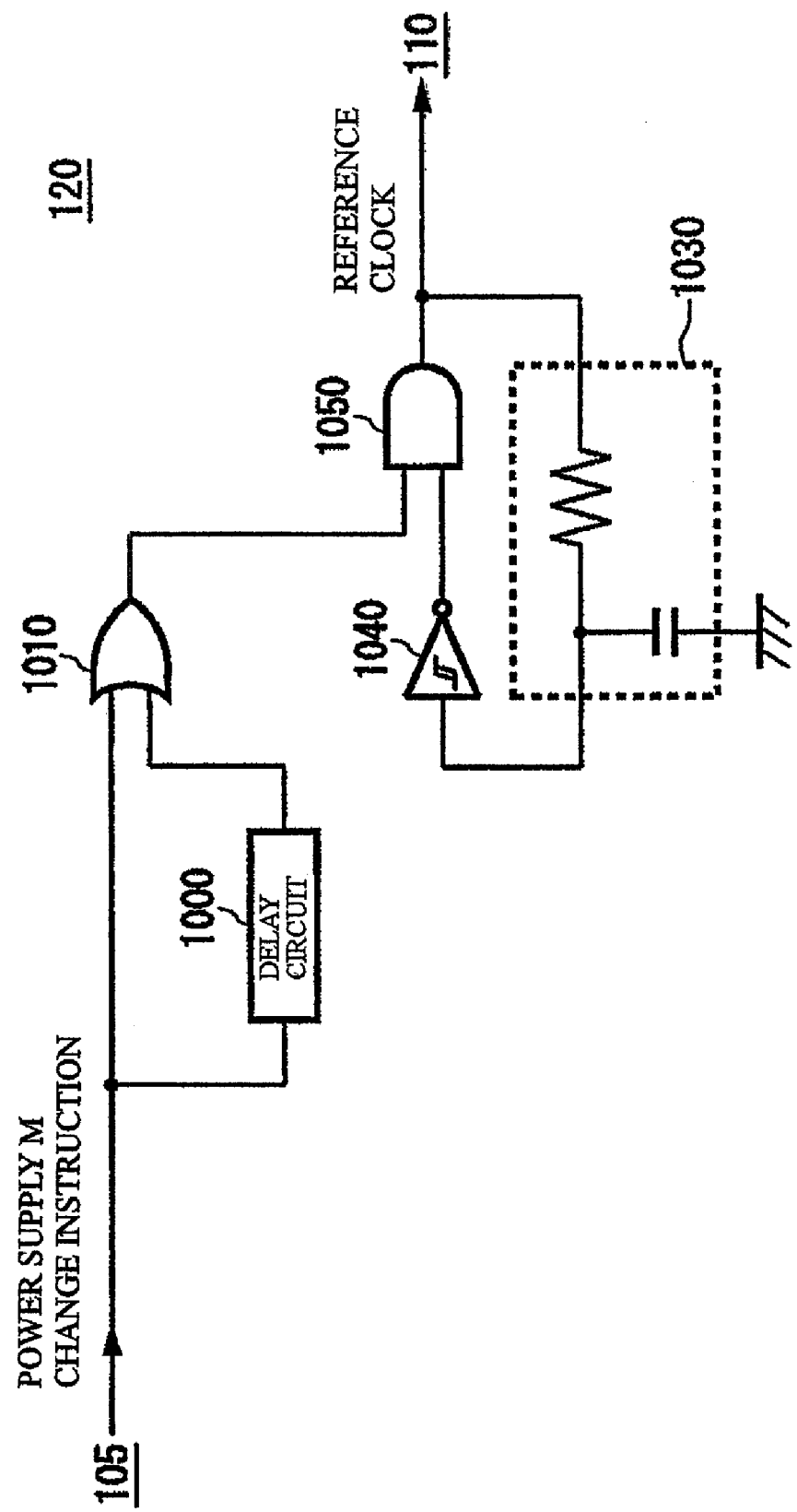
FIG. 3 is a block diagram of a reference clock oscillation section 120.

FIG. 3 shows a block diagram of the reference clock oscillation section 120, which includes a delay circuit 1000, a logical sum (OR gate) operation circuit 1010, the RC delay circuit 1030, a Schmidt inverter 1040, and a logical product (AND gate) operation circuit 1050. The input to the delay circuit 1000 is the power supply M change instruction signal. The OR gate 1010 receives the undelayed and delayed change instruction signal and outputs the logical sum to the AND gate 1050.

The RC delay circuit 1030 delays the input reference clock signal by a predetermined amount and outputs the delayed clock signal to the Schmidt inverter 1040. The Schmidt inverter 1040 shapes the waveform of the delayed reference clock into a generally rectangular shape and forms a feedback loop gated by the logical AND operation 1050 circuit. The reference clock oscillation section 120 may incorporate a variable delay to adjust the frequency of the reference clock. Accordingly, to accommodate different models of the information processor 100, alternate versions of the delay circuit 1030, may be implemented to ensure compatibility with the power control circuit 300.

The logical AND operation circuit 1050 gates the feedback loop formed by RC delay circuit 1030 and the Schmidt inverter 1040. More specifically, the logical AND operation circuit 1050 supplies the product of the logical OR circuit 1010 and the Schmidt inverter 1040 to the state register section 110. The reference clock oscillation section 120 also outputs the desired reference clock by dividing the frequency of the clock output by the logical product operation circuit 1050.

Thus, the reference clock oscillation section 120 oscillates the reference clock when it receives a change instruction to supply one of the plurality of sections of the information processor 100. When the reference clock oscillation section 120 receives a change instruction to stop supplying voltages to all of the sections of the information processor 100, for example, when the power supply M change instruction indicating that the power supply M is to be activated becomes zero, the reference clock oscillation section 120 stops the reference clock after a lapse of a predetermined delay.

FIG. 4 illustrates the plurality of operating modes discriminated in power consumption from each other. For example, the information processor 100 has as operating modes an all-power-supply-off mode in which the AC adaptor is not connected and the PC is not activated, a power-supply-off mode in which the AC adaptor is connected and the battery is charged, a suspend mode in which the operating state of the information processor 100 is saved to the memory, and a power-supply-on mode in which information processing can be executed by receiving a start instruction from a user.

In the all-power-supply-off mode, the information processor 100 turns off each of the power supplies M, A, and B. That is, when the power supply controller 10 receives a power supply control instruction from the south bridge 30 to effect a transition to the all-power-supply-off mode, the state value setting combination circuit 105 supplies a change instruction to the state value changing combination circuit 130 to turn off each of the power supplies M, A, and B.

Similarly, in the power-supply-off mode, the information processor 100 turns the power supplies M, A, and B on, off, and off, respectively. In the suspend mode, the information processor 100 turns the power supplies M, A, and B on, on, and off, respectively. In the power-supply-on mode, the information processor 100 turns on each of the power supplies M, A, and B. Consequently, the operating mode determines both the combination of functional sections receiving power and the overall power consumption of the information processor 100.

Figure 5:
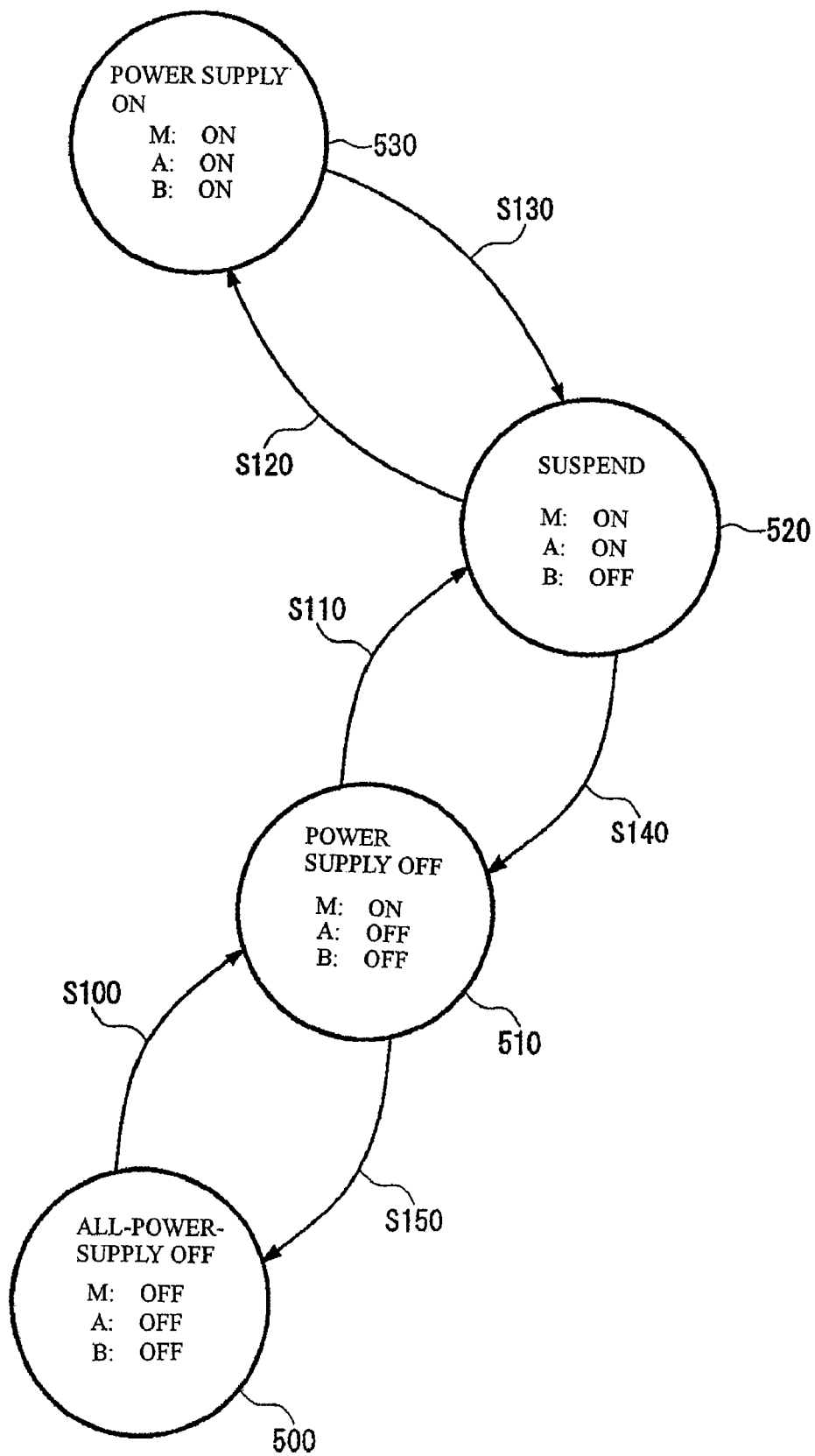
FIG. 5 is a state transition diagram showing the plurality of operating modes.

FIG. 5 shows the state transition diagrams of the operating modes. In an initial state, the information processor 100 is set in the all-power-supply-off mode 500. In this state, the power supply controller 10 sets each of the power supplies M, A, and B in the off state. When the information processor 100 becomes connected to the AC adaptor, the power supply controller transitions to the power-supply-off mode 510 (S100) by turning on power supply M.

When the information processor 100 receives a start instruction from a user, such as when the information processor 100 is initially powered up, the power supply controller 10 temporarily transitions to the suspend mode 520 (S110) by switching on power supply A. The power supply controller 10 then transitions to the power-supply-on mode 530 (S120) by switching on power supply B.

When the information processor 100 receives a power-supply shut-off instruction from the user while in the power-supply-on mode, the power supply controller 10 transitions to the suspend mode 520 (S130) by turning off power supply B. Subsequently, the power supply controller 10 transitions to the power-supply-off mode 510 (S140) by switching off power supply A. If the information processor 100 is disconnected from the AC adaptor, the power supply controller 10 transitions to the all-power-supply-off mode 500 (S150) by switching off power supply M. Finally, the information processor 100 receives a suspension instruction from the user in the power-supply-on mode 530, the power supply controller 10 sets the power supply B in the off state to effect a transition to the suspend mode 520 (S130).

Accordingly, when the state value changing combination circuit 130 receives a change instruction to change the combination of voltages supplied to the individual functional sections of the information processor 100, it changes state values one by one in a predetermined order indicating which of the functional sections the voltage should first be changed. The information processor 100 can effect state transitions in a predetermined order between the plurality of operating modes. That is, the power supply controller 10 can prevent a transition to an undefined or invalid state. For example, a state in which the power supplies M and B are on while the power supply A is off.

When the state value changing combination circuit 130 receives an invalid change instruction that does not correspond to any of the four operating modes, it sets state values according to the closest matching operating mode. For example, when the state value changing combination circuit 130 receives a change instruction to turn the power supplies M, A, and B on, off, and on, respectively, it will detect that the sinks to which voltages are to be supplied correspond to none of the operating modes. In this case, the state value changing combination circuit 130 sets a valid state according to the change instruction and corresponding to one of the operating modes, such as the power-supply-off mode 510 in which the power supplies M, A, and B are turned on, off, and off, respectively. Alternatively, when the state value changing combination circuit 130 receives an invalid state change instruction, it may maintain the state values set before the change regardless of the change instruction.

Figure 6:
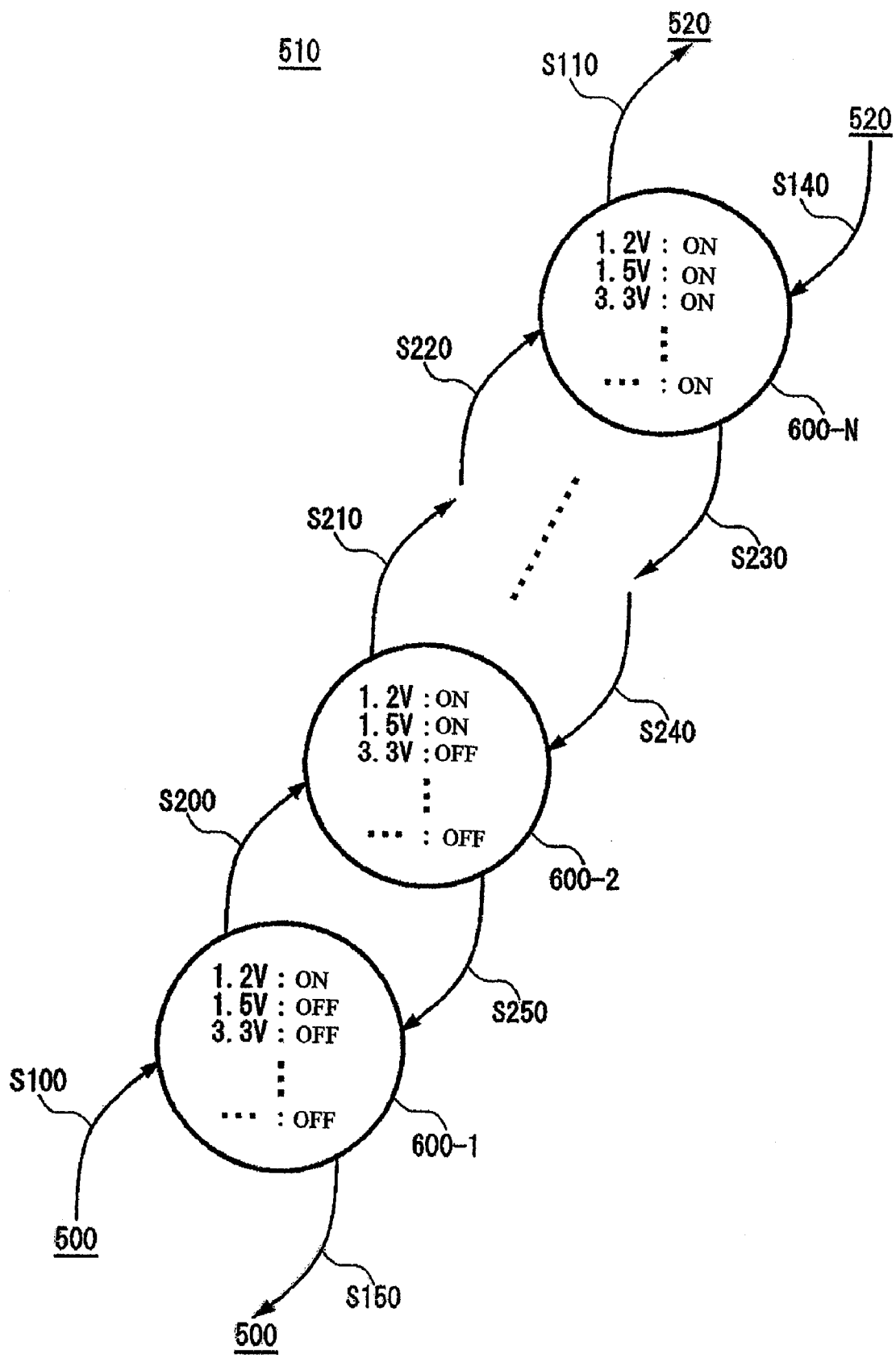
FIG. 6 is a state transition diagram for a power-supply-off mode 510.

FIG. 6 shows the state transition in the power-supply-off mode 510, which includes power-supply-off modes 600-1 to 600-N. For example, when the information processor 100 is connected to the AC adaptor in the all-power-supply-off mode 500, the power supply controller 10 sets a state value for supplying a voltage of 1.2 V to the sinks connected to power supply M, thereby effecting a transition to the power supply-off mode 600-1 (S100).

The information processor 100 then sets a state value for further supplying a voltage of 1.5 V to the sinks connected to power supply M, thereby effecting a transition to the power supply-off mode 600-2. The information processor 100 changes the state values one by one in accordance with the reference clock to effect state transitions (S210, S220) and complete a transition to the power supply-off mode 600-N in which all of the plurality of voltages are supplied to the sinks to which power supply M is connected.

When the state value changing combination circuit 130 receives a power supply M change instruction to begin supplying the plurality of voltages to the south bridge 30 and the control microcomputer 40, the state register 110 the state values are set to start supplying voltages sequentially from a lower one of the plurality of voltages. Consequently, the information processor 100 can sequentially start supplying the plurality of voltages from a lower one of them and effect a transition to the state in which all the plurality of voltages are supplied to the sinks connected to power supply M.

If the information processor 100 is then disconnected from the AC adaptor in the power supply-off mode 600-N, the power supply controller 10 changes the state values one by one to effect state transitions (S230, S240) to discontinue supplying voltages sequentially starting from a higher voltage. The power supply controller 10 sets the state values for supplying voltages of 1.2 V and 1.5 V to the sections corresponding to the power supply M to effect a transition to the power-supply-off mode 600-2. Further, the power supply controller 10 sets the state value for stopping the 1.5 V supply to effect a transition to the power-supply-off mode 600-1 in which the state value for supplying the voltage 1.2 V is set.

The state value changing combination circuit 130 sets the state value in the state register 110 for sequentially discontinuing the voltage supply from a higher one of them when it receives the power supply M change instruction to stop supplying all the voltages supplied by power supply M. Therefore the information processor 100 stops supplying the plurality of voltages sequentially beginning with the highest one and continuing in descending order. In this manner, the information processor 100 can effect a transition to the state where none of the plurality of voltages is supplied by power supply M.

In the embodiment shown in FIG. 6, the state value changing combination circuit 130 changes state values to start supplying voltages in a predetermined order from a lower one of the voltages and to stop supplying the voltages in a predetermined order from a higher one of the voltages. Alternatively, the state value changing combination circuit 130 may change state values to start supplying voltages in a predetermined order from a higher one of the voltages and to stop supplying the voltages in a predetermined order from a lower one of the voltages. That is, the order is determined according to the specifications of the integrated circuits to which the voltages are supplied.

Figure 7:
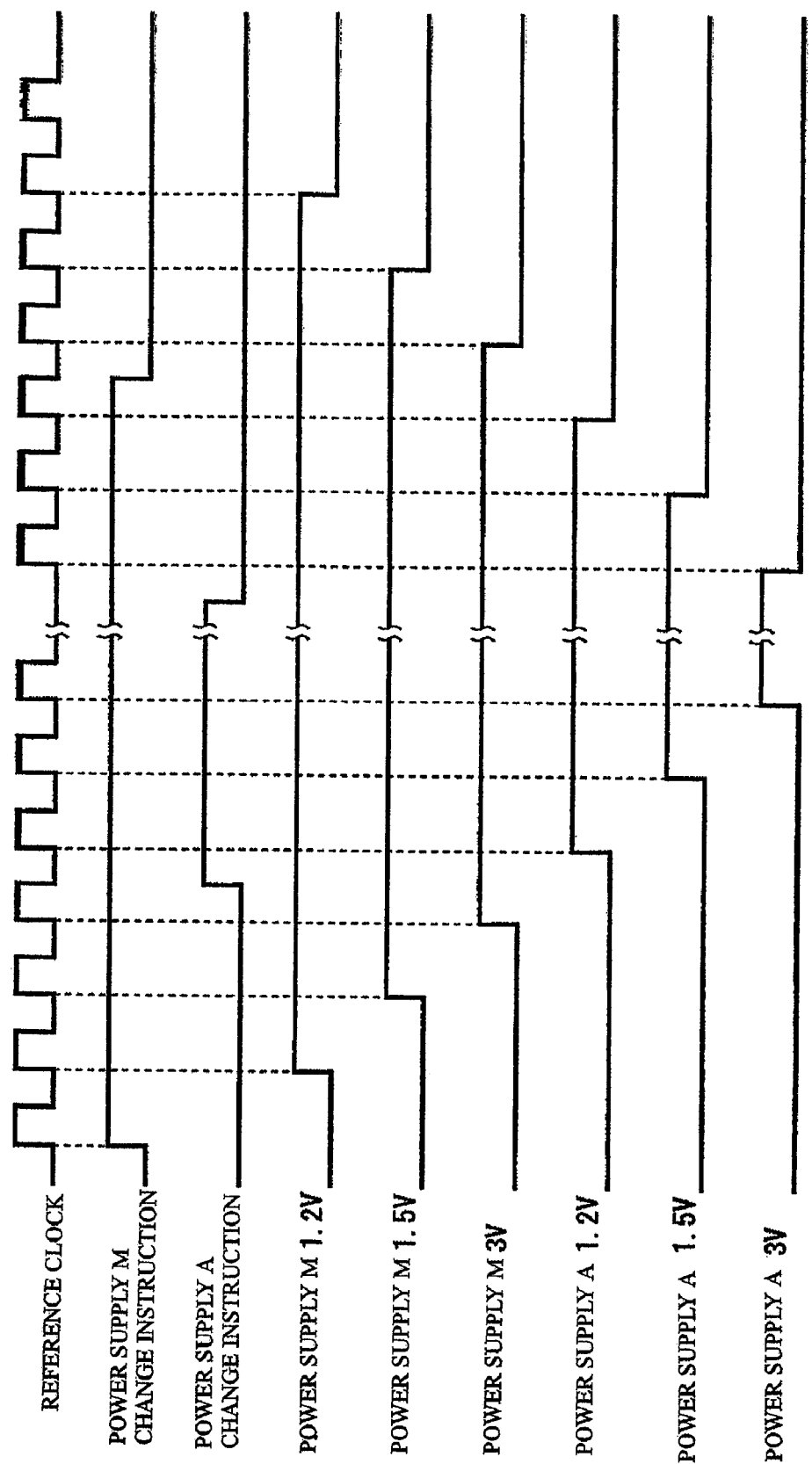
FIG. 7 is a diagram showing timing of supply of voltages changed on the basis of a reference clock.

FIG. 7 shows the timing of supply voltage transitions for power supplies M and A corresponding to the reference clock. (The configuration and routing of power supply B is similar to power supplies M and A.) When the reference clock oscillation section 120 receives a power supply M change instruction to begin supplying power from power supply M, it starts oscillating the reference clock. When the state value changing combination circuit 130 receives the power supply M change instruction, it begins supplying voltages of 1.2 V, 1.5 V and 3 V sequentially to the sinks connected to power supply M. Subsequently, when the state value changing combination circuit 130 receives a power supply A change instruction to begin supplying power from the power supply A, it starts supplying voltages of 1.2 V, 1.5 V and 3 V sequentially to the sinks connected to power supply A.

Similarly, if the state value changing combination circuit 130 receives a power supply A change instruction to stop supplying power from the power supply A, for example, when the signal representing the power supply A change instruction becomes zero, it stops supplying voltages of 3 V, 1.5 V and 1.2 V sequentially to the sinks connected to power supply A. When the state value changing combination circuit 130 subsequently receives a power supply M change instruction to stop supplying power from the power supply M, for example, when the signal representing the power supply A change instruction becomes zero, it sequentially stops, on the basis of the reference clock, supplying voltages of 3 V, 1.5 V and 1.2 V to the sinks connected to power supply M. If the signal representing both the power supply M change instruction and the power supply A change instruction equals zero, the state value combination circuit 130 stops the supply of power and the reference clock oscillation section 120 stops oscillating the reference clock.

In the example shown in FIG. 7, the state value changing combination circuit 130 changes each of the state values in sequence each time it receives one reference clock pulse. Alternatively, the state value changing combination circuit 130 may change the state values over any multiple of clock cycles. That is, the state value changing combination circuit 130 may change the state values at intervals determined by individual device or integrated circuit specifications.

The power supply controller 10 can sequentially start supplying power from the plurality of power supplies or sequentially stop supplying power from the power supplies by changing the state values one by one in a predetermined order based on the reference clock. Therefore the power supply controller 10 can start supplying power from the power supplies in an order determined in the design of the information processor 100 to prevent a malfunction or destruction of the information processor 100. The power supply controller 10 can also sequentially start or stop supplying a plurality of voltages to the functional sections of the information processor 100 to which the power supplies are routed. In this regard, the power supply controller 10 can start supplying power from the plurality of power supplies in a predetermined order satisfying conditions according to the particular integrated circuit specifications, thereby preventing a malfunction or destruction of the integrated circuits.

Since the reference clock in the power supply controller 10 is oscillated only when power distribution is being affirmatively managed, the power consumption can be reduced for those operating modes in which it is unnecessary to control the supply of power. Further, the power supply controller 10 is capable of adjusting the reference clock by changing the RC delay circuit 1030 without changing the design of the power supply control circuit 300. That is, the power supply controller 10 can flexibly adjust voltage supply timing even in a case where a change is made in the design of the integrated circuit being supplied.

While the invention has been described in detail, the foregoing description is in all aspects illustrative and not restrictive. It is understood that numerous other modifications and variations can be devised without departing from the scope of the invention.

As is apparent from the above description, the present invention enables suitable control of supply of a plurality of voltages.

What is claimed is:

1. A power supply controller which directs the supply of a plurality of different voltages from a power supply unit, comprising:
   a state register circuit to store state values corresponding to a combination of voltages supplied by the power supply unit;
   a reference clock oscillator circuit;
   a state value setting combination circuit which generates a change instruction to change the combination of voltages supplied by the power supply unit;

a state value changing combination circuit which changes the state values one by one in a predetermined order corresponding to a target combination of voltages when the change instruction is received to change the combination of voltages supplied by the power supply unit;

an output section to transmit the combination of voltages corresponding to the change instruction state values successively changed by said state value changing combination circuit to the power supply unit, wherein an information processor to which the plurality of voltages are supplied has a plurality of sections operating on the plurality of voltages;

said state register circuit has state values of combinations of voltages respectively supplied to the plurality of sections;

when said state value changing combination circuit receives the change instruction to change the combination of voltages supplied to the plurality of sections it changes the state values in a predetermined order indicating for which one of the sections the voltage should be changed first;

said output section supplies the combinations of voltages corresponding to the state values changed one by one from the power supply unit to the sections of the information processor;

wherein a predetermined combination of voltages provided to the sections of the information processor are supplied through one of a plurality of operating modes discriminated in power consumption in the information processor; and when the state value changing combination circuit receives an invalid change instruction corresponding to none of the plurality of operating modes, it sets the state values far supplying a combination of voltages representing the nearest corresponding valid operating mode.

2. The power supply controller according to claim 1, wherein the change instruction specifying a power on sequence of the combination of supplied voltages starts with the lowest supplied voltage.

3. The power supply controller according to claim 1, wherein the change instruction specifying a power off sequence of the combination of supplied voltages, starts from the highest supplied voltage.

4. The power supply controller according to claim 1, wherein said reference clock is enabled after receiving the change instruction to supply a voltage to one of the plurality of sections of the information processor.

5. The power supply controller according to claim 1, wherein said reference clock is disabled after receiving the change instruction to stop supplying voltages to all the sections of the information processor and said state value changing combination circuit has stopped supplying the plurality of voltages to all the sections.

6. The power supply controller according to claim 1, wherein said reference clock oscillator circuit further comprises:

a delay circuit to provide a delayed change instruction signal;

a first logic gate that determines the logical sum of the delayed change instruction signal and the undelayed change instruction signal;

an RC delay circuit to provide a delayed reference clock signal; and a Schmidt inverter which accepts the output from the RC delay circuit; and a second logic gate that determines the logical product of the output of the Schmidt inverter and the output of the first logic gate and completes a feedback loop for the reference clock.

7. A power supply controller which controls a power supply unit having a plurality of power supplies each of which can be independently set to a plurality of states, said power supply controller comprising:

a state register circuit to store state values corresponding to a combination of voltages supplied by the power supply unit;

a state value setting combination circuit which generates a change instruction to change the combination of voltages supplied by the power supply unit;

a state value changing combination circuit which changes the state values one by one in a predetermined order corresponding to the temporal order in which a target combination of voltages is desired to be received when the change instruction is received to change the combination of voltages supplied by the power supply unit; and an output section to transmit the combination of voltages corresponding to the change instruction state values successively changed by the state value changing combination circuit to the power supply unit.

8. An information processor which operates using a plurality of different operating voltages comprising:

a state register section which stores stare values corresponding to a combination of voltages supplied to the information processor;

a reference clock oscillator circuit;

a state value setting combination circuit which generates a change instruction to change the combination of voltages supplied to the information processor;

a state value changing combination circuit which changes the state values one by one in a predetermined order corresponding to the temporal order in which a target combination of voltages is desired to be received when the change instruction is received to change the combination of voltages supplied by the power supply unit;

an output section through which the information processor is supplied the combination of voltages corresponding to the state values successively changed by said state value changing combination circuit; and a power supply unit which supplies power to the information processor according to an instruction from said output section.

9. The information processor according to claim 8, further comprising a plurality of sections operating on the plurality of voltages, wherein said state register section stores combinations of voltages respectively supplied to the plurality of sections;

said state value changing combination circuit changes the state values in a predetermined order indicating for which one of the sections the voltage should be changed first; and said output section supplies the combinations of voltages corresponding to the state values changed one by one from the power supply unit to the sections of the information processor.

10. The information processor according to claim 9, wherein said reference clock is enabled when the change instruction to supply a voltage to one of the plurality of sections is received.

11. The information processor according to claim 9, wherein said reference clock is disabled when the change instruction to stop supplying voltages to all the sections of the information processor is received and said state value changing combination circuit has stopped supplying the plurality of voltages to all the sections.

12. An information processor which operates using a plurality of power supplies each of which can be independently set in an on or off state, said information processor comprising:
- a state register section which stores state values corresponding to a combination of voltages supplied to the information processor;
- a reference clock oscillator circuit;
- a state value setting combination circuit which generates a change instruction to change the combination of voltages supplied to the information processor;
- a state value changing combination circuit which changes the state values one by one in a predetermined order corresponding to the temporal order in which a larger combination of voltages is desired to be received when the change instruction is received to change the combination of voltages supplied by the power supply unit;
- an output section through which the information processor is supplied the combination of voltages corresponding to the state values successively changed by said state value changing combination circuit; and
- a power supply unit which supplies power to the information processor according to an instruction from said output section.

13. A method of supplying a plurality of voltages from a multiple voltage level power supply to an information processor, the method comprising:
- providing a state register circuit to store state values corresponding to a combination of voltages supplied by the power supply unit;
- providing a reference clock oscillator circuit;
- providing a state value setting combination circuit which generates a change instruction to change the combination of voltages supplied by the power supply unit;
- providing a state value changing combination circuit which changes the state values one by one in a predetermined order corresponding to a target combination of voltages when the change instruction is received to change the combination of voltages supplied by the power supply unit;
- providing an output section to transmit the combination of voltages corresponding to the change instruction state values successively changed by said state value changing combination circuit to the power supply unit;
- providing a delay circuit within the reference clock oscillator circuit to delay a change instruction signal input to the reference clock oscillator circuit;
- providing a first logic gate that determines the logical sum or the delayed change instruction signal and the widelayed change instruction signal;
- providing an RC delay circuit to provide a delayed reference clock signal;
- providing a Schmidt inverter which inputs the RC delay circuit output; and
- providing a second logic gate that determines the logical product of the output of the Schmidt inverter and the output of the first logic gate and completes a feedback loop for the reference clock.

14. The method according to claim 13 further comprising:
- structuring the change instruction such that a power on sequence of the combination of supplied voltages begins with the lowest supplied voltage; and
- structuring the change instruction such that a power off sequence of the combination or supplied voltages begins with the highest supplied voltage.

15. The method according to claim 13 further comprising:
- storing said combinations of voltages respectively supplied to the plurality of sections in the state register circuit;
- programming said state value changing combination circuit such that the state values are changed in a predetermined order indicating for which one of the sections the voltage should be changed fist; and
- supplying said combinations of voltages corresponding to the state values changed one by one from the power supply unit to the sections of the information processor.

16. The method according to claim 13 further comprising:
- enabling said reference clock after receiving the change instruction to supply a voltage to one of the plurality of sections of the information processor.

17. The method according to claim 13 further comprising:
- disabling said reference clock after receiving the change instruction to stop supplying voltages to all the sections of the information processor and said state value changing combination circuit has stopped supplying the plurality of voltages to all the sections.

* * * * *